(12) United States Patent
Aaltonen (10) Patent No.: US 8,189,133 B2
(45) Date of Patent: May 29, 2012

(54) DISPLAY MODULE AND METHOD FOR FIXING

(75) Inventor: Antero Aaltonen, Salo (FI)

(73) Assignee: Nokia Corporation, Espoo (FI)

(*) Notice: Subject to any disclaimer, the term of this patent is extended or adjusted under 35 U.S.C. 154(b) by 795 days.

(21) Appl. No.: 12/278,425

(22) PCT Filed: Feb. 10, 2006

(86) PCT No.: PCT/IB2006/050446
§ 371 (c)(1),
(2), (4) Date: Dec. 22, 2008

(87) PCT Pub. No.: WO2007/091130
PCT Pub. Date: Aug. 16, 2007

(65) Prior Publication Data
US 2011/0255036 A1   Oct. 20, 2011

(51) Int. Cl.
*G02F 1/1333* (2006.01)
(52) U.S. Cl. .......................... 349/58; 362/632
(58) Field of Classification Search .............. 349/58, 349/65, 96, 150, 158, 139, 187; 362/631, 362/97.1, 97.2, 632–634; 445/24, 25
See application file for complete search history.

(56) References Cited

U.S. PATENT DOCUMENTS

| | | | |
|---|---|---|---|
| 5,835,179 A * | 11/1998 | Yamanaka | 349/161 |
| 5,867,316 A * | 2/1999 | Carlson et al. | 359/487.02 |
| 6,177,971 B1 | 1/2001 | Jung et al. | |
| 6,411,359 B1 * | 6/2002 | Kobayashi et al. | 349/149 |
| 6,549,263 B1 * | 4/2003 | Kim | 349/58 |
| 6,630,968 B1 * | 10/2003 | Tsuchihashi et al. | 349/65 |
| 6,897,912 B2 * | 5/2005 | Kawakami et al. | 349/61 |
| 7,289,037 B2 * | 10/2007 | Uken et al. | 340/815.4 |
| 2003/0133070 A1 | 7/2003 | Nam | |
| 2004/0080683 A1 | 4/2004 | Mai | |
| 2004/0135936 A1 | 7/2004 | Lee | |
| 2006/0092345 A1 * | 5/2006 | Takeuchi | 349/60 |

FOREIGN PATENT DOCUMENTS

| EP | 0424951 A1 | 5/1991 |
|---|---|---|
| EP | 1429366 A1 | 6/2004 |

OTHER PUBLICATIONS

European Search Report for Application No. 06710876.1-2205/1987709 dated Oct. 18, 2010.
International Search Report for PCT/IB2006/050446.

* cited by examiner

*Primary Examiner* — Thoi Duong
(74) *Attorney, Agent, or Firm* — Banner & Witcoff, Ltd.

(57) ABSTRACT

A display module (12) adapted to be received in a module frame (27,34), the display module (12) comprising front and rear substrates (13,14). The rear substrate (14) of the display module (12) is extended in its principal plane to provide a ledge (26), which exposes the inner face (17) of the rear substrate (14) such that the display module (12) may be secured in the module frame (27,34) by a fixing between the inner face (17) of the rear substrate (14) and a face of the module frame (27,34).

30 Claims, 7 Drawing Sheets

Figure 1

Prior Art

Figure 2

Prior Art

DISPLAY MODULE AND METHOD FOR FIXING

The present invention relates to a display module, particularly, but not exclusively, to the structure and fixings of a Liquid Crystal Display (LCD) module to a carrier product.

An LCD module comprises a layer of liquid crystal material sandwiched between front and rear substrates. The front and rear substrates may comprise, for example, panels formed from plastics or glass. The liquid crystal material may be manipulated by electrodes on the substrates, such that the liquid crystals allow varying amounts of light to pass through different areas of the display. In this way, the LCD module is able to create an image.

In comparison with other varieties of display apparatus, the construction of an LCD means that it has very shallow depth. Display apparatus using cathode ray tubes, for example, are necessarily much bulkier than those using LCDs. Accordingly, if display apparatus are to be integrated into a carrier product, for example a laptop computer, mobile telephone or PDA, the use of an LCD enables a significant reduction in the product depth. In this regard, the application of LCDs is particularly advantageous to portable devices where the overall size of the carrier product is significant.

In a conventional construction, a carrier product provides an LCD module frame to receive the LCD and to secure it in position. The LCD module is initially secured to the module frame by a layer of double-sided tape applied between the module frame and the outer face of the rear substrate. However, the adhesion force of the tape alone is insufficient to provide a permanent fixing and so further fastenings must be made to the outer surface of the front substrate to properly secure the module in position. These further fastenings may be made between, for example, the outer face of the front substrate and the inner surface of the carrier product's cover.

In this type of construction, because fixings are made to the outer face of the front substrate, the LCD does not lie flush with the external surface of the carrier product. In consequence, the advantages in depth, provided by the LCD, cannot be fully propagated to the depth of the carrier. The carrier product must always provide significant extra depth in order to allow for fixings to the outer face of the front substrate of the LCD. The conventional construction, therefore, opposes one of the principal benefits provided by the use of an LCD.

According to the present invention, there is provided a display module adapted to be received in a module frame, the module comprising a front substrate and a rear substrate, wherein the rear substrate of the display module extends along its principal plane beyond the perimeter of the front substrate to provide a ledge.

The rear substrate has an inner face and the display module may further include a mounting point on the inner face of the ledge and a fixing, the fixing being made between the mounting point and a face of the module frame.

The rear substrate has an end face and the display module may further include a mounting point on the end face of the ledge and a fixing, the fixing being made between the mounting point and a face of the module frame.

The rear substrate has an outer face and the display module may further include a mounting point on the outer face of the ledge and a fixing, the fixing being made between the mounting point and a face of the module frame.

The front substrate has an outer face and the display module may be received in a carrier product having an external surface, wherein the outer face of the front substrate lies flush with the external surface of the carrier product.

Embodiments of the present invention will now be described, by way of example, with reference to the accompanying drawings, in which.

Figure 1:
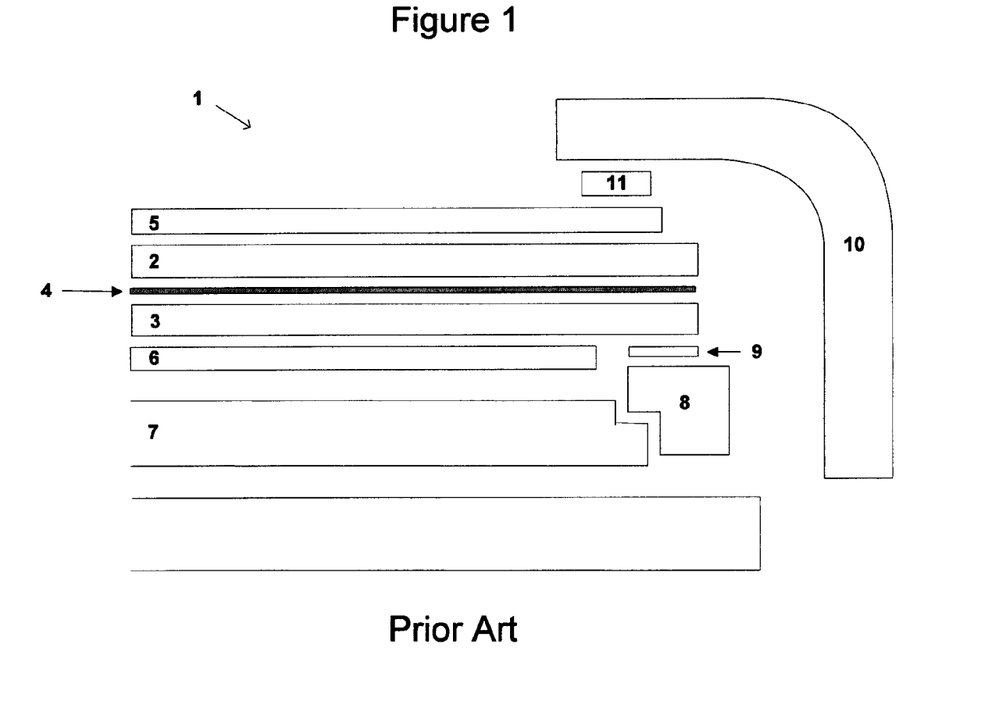
FIG. 1 is an illustration showing an exploded view of a conventional method of fixing an LCD module to an LCD module frame in a carrier product.

Referring to FIG. 1, a conventional LCD module 1 comprises front and rear substrates 2,3 which sandwich a layer of liquid crystal material 4 between them. The front and rear substrates may comprise panels formed from plastics, glass or any other suitable material. The liquid crystal material 4 is held in a sealed cavity between the substrates, which is maintained by a plurality of spacers (not shown). The outer face of each substrate 2,3 is polarized by a polarizing film 5,6, which is applied in order to filter electromagnetic radiation. The LCD module 1 is illuminated by a plurality of fluorescent lamps (not shown) such that a lightguide 7 and other optical foils redirect and scatter the light evenly over the LCD, creating a uniform display.

Figure 2:
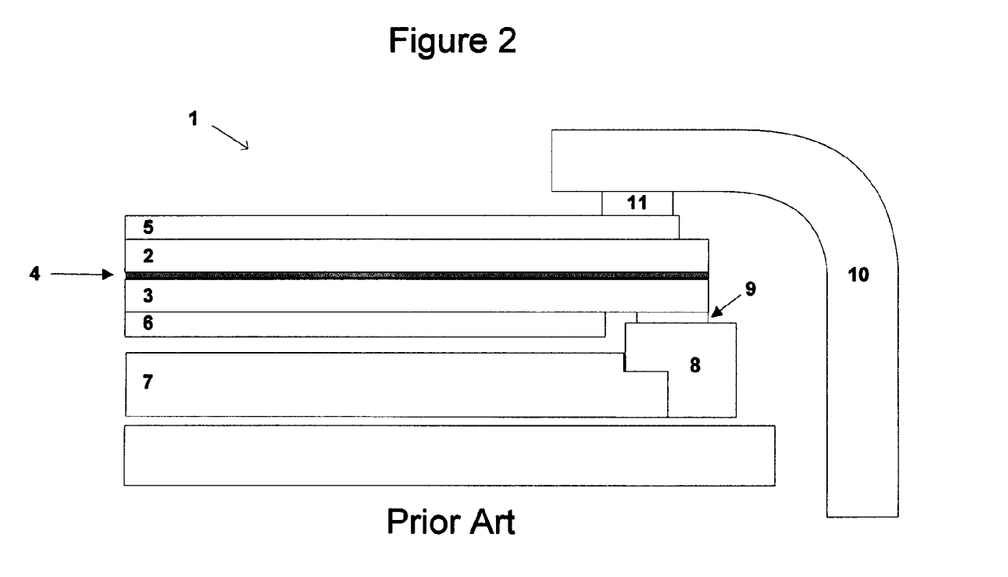
FIG. 2 is an illustration showing a conventional method of fixing an LCD module to an LCD module frame corresponding to FIG. 1.

The LCD module 1 is received in a carrier product, for example a mobile telephone, which provides an LCD module frame 8 for securing the LCD module 1 is position. The LCD module 1 is fixed to the LCD module frame 8 by an adhesive layer 9, which may be provided by a layer of double-sided tape. The adhesive layer 9 is applied so as to join the outer face of the rear substrate 3 to a front surface of the module frame 8. The LCD module 1 is further fixed to a cover 10 of the carrier product by another adhesive layer or by a gasket 11. The gasket 11 supports the LCD module 1 from the outer face of the front substrate 2 by joining the front substrate 2 to a rear surface of the cover 10. FIG. 2 shows an example of how the above-described fixings may secure the LCD module 1 in position.

As previously discussed, the fixing 11 between the LCD module 1 and the cover 10 necessitates an increase in the thickness of the carrier product. The effect is that the carrier product is not only bulkier and potentially more awkward to carry, but is also less aesthetically pleasing.

Figure 3:
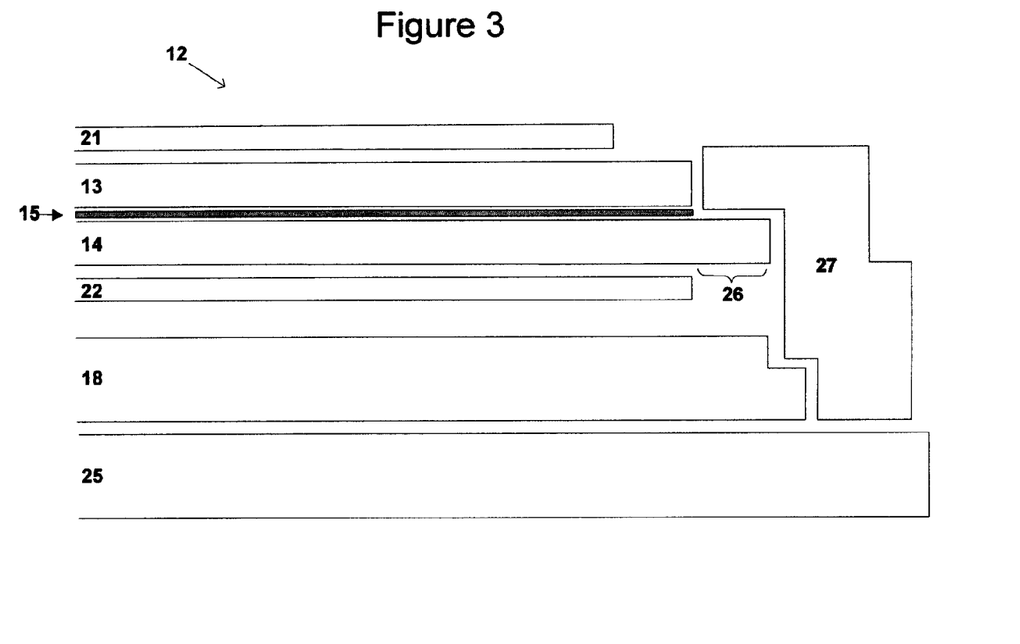
FIG. 3 is an illustration showing an exploded view of a method, in accordance with the invention, of fixing an LCD module to an LCD module frame in a carrier product.
Figure 4:
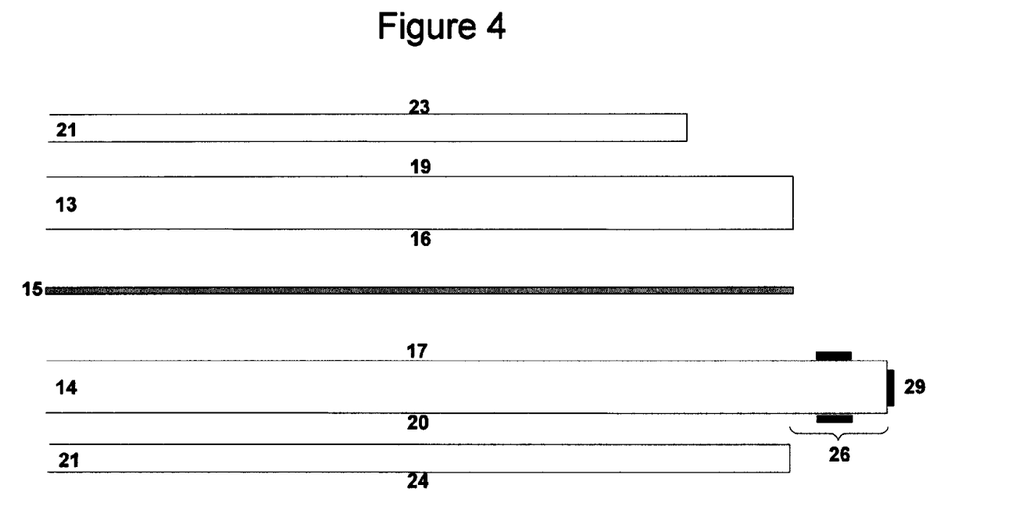
FIG. 4 is an illustration showing inner and outer faces of front and rear substrates.

Referring to FIGS. 3 and 4, in accordance with the invention, there is provided an LCD module 12 comprising front and rear substrates 13,14 which sandwich a layer of liquid crystal material 15 between them. As described in reference to the conventional LCD module 1, the front and rear substrates may comprise panels formed from plastics, glass or any other suitable material. The liquid crystal material 15 is held in a sealed cavity between the substrates 13,14, the cavity being maintained by a plurality of spacers (not shown). The front and rear substrates 13,14 are each rubbed with a transparent conductive material, for example indium-tin oxide, on their inner faces 16,17 so as to create a plurality of parallel, electrically conductive ridges on the surface. The LCD module 12 is assembled such that the ridges of the front and rear substrates 13,14 are aligned at right angles to one another, creating rows and columns in a conductive grid. The rows and columns of the grid intersect to define pixels on the LCD.

The LCD module 12 is illuminated from the rear by a lightguide 18 and other optical foils, which scatter light provided by a plurality of fluorescent lamps (not shown) so as to uniformly illuminate the LCD.

The outer faces 19,20 of the substrates 13,14 are coated with polarizing films 21,22 so as to filter incident electromagnetic radiation and block waves whose plane of polarization does not correspond to the films 21,22. The polarizing films 21,22 are oriented at right-angles to one another, such that the polarizing direction of each film corresponds to the direction of the conductive ridges on its substrate 21,22. Each polarizing film 21,22 has an outer face 23,24, as shown in FIG. 4.

Liquid crystals in contact with the inner faces 16,17 of the substrates 13,14 align with the direction of the conductive ridges. The interaction between crystals in the material is such that the orientation of crystals in intermediate layers of material is rotated gradually through ninety degrees to match the orientation of the crystals at each inner face 16,17. The liquid crystal material 15 may comprise twisted nematic liquid crystals, which react predictably to an applied voltage to change their orientation.

The crystals act as a guide to incident light, rotating its plane of polarization in a manner corresponding to the rotation of the liquid crystal material. Therefore, upon reaching the inner face of the second substrate, the polarization of the light has been rotated through ninety degrees. In this way, incident light may be transmitted through both polarizing films 21,22 of the LCD module 12.

The rows and columns of the conductive grid are connected to a plurality of integrated circuits, which are adapted such that they may supply electrical current to the grid. The integrated circuits are, in turn, connected to a Printed Circuit Board (PCB) 25. The integrated circuits are adapted to control the flow of charge through the grid in order affect the orientation of liquid crystals and manipulate the image on the LCD.

To deliver a voltage to a particular intersection of the grid, and hence pixel on the display, a charge is sent down the correct conductive column of the grid and, at the same time, the correct conductive row is connected to ground. The voltage received at the intersection forces the surrounding liquid crystals 15 to untwist, altering their affect on the polarization of light passing through them. Under these conditions, the plane of polarization of light, passing from the rear to the front of the LCD 12, is not rotated to correspond with the polarizing film 21 on the face 19 of the front substrate 13. Consequently, light is blocked by the film 21 and the LCD appears darker at that point.

In one embodiment of the invention, the LCD module 12 is a passive matrix LCD module. In another embodiment of the invention, the LCD module 12 is an active matrix LCD module in which pixel response time is improved by an array of thin film transistors (TFTs) and capacitors, which incorporate an active switching element to the display. The capacitors and TFTs are located at the intersections of the conductive grid and are comprised as part of the rear substrate 14.

In a further embodiment of the invention, the LCD module 12 is adapted to provide a colour image. In this embodiment, each of the pixels comprises three sub-pixels, having red, green and blue filters respectively. Each of the sub-pixels is provided with its own TFT and capacitor such that the quantity of light passing through each filter may be precisely controlled by manipulation of the surrounding liquid crystals.

Figure 5:
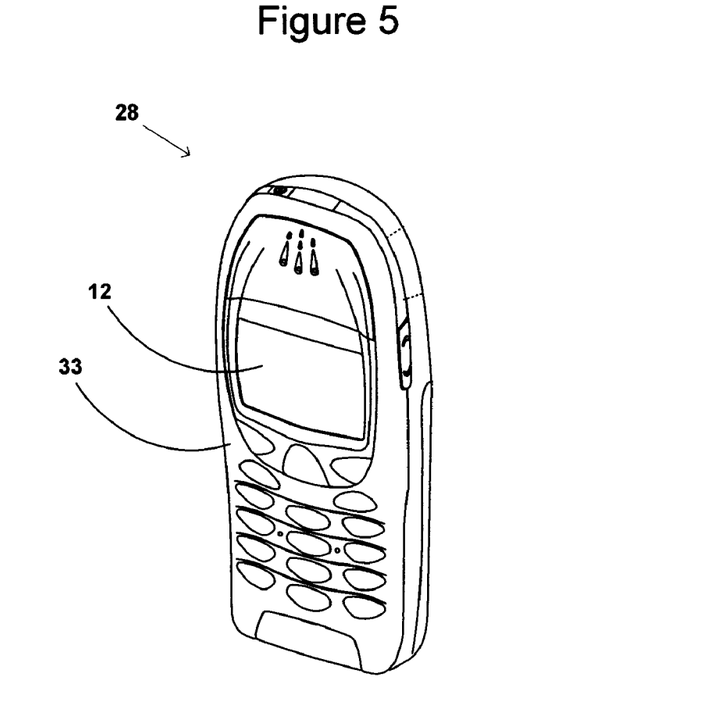
FIG. 5 is an illustration of a carrier device for receiving an LCD module.
Figure 6:
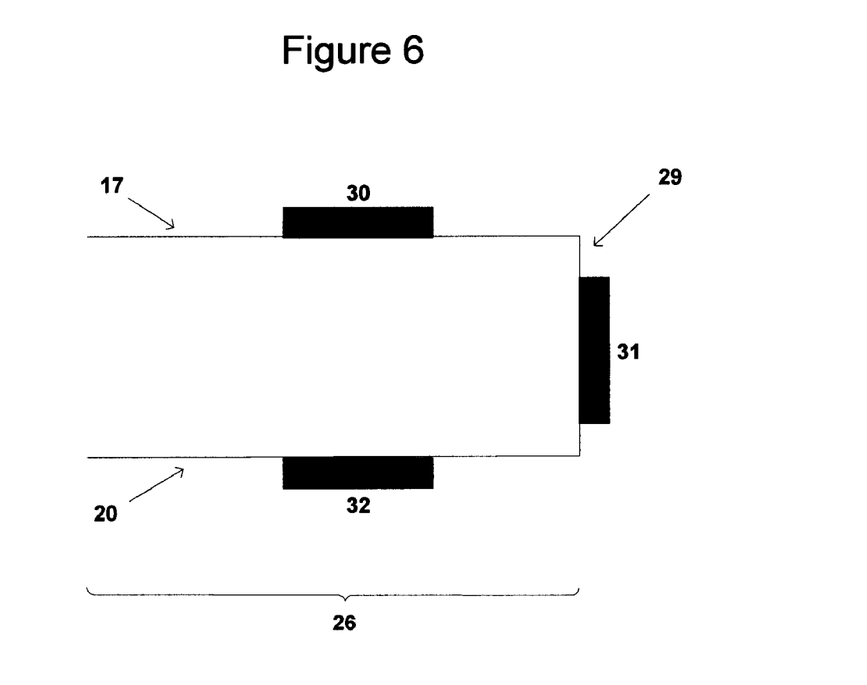
FIG. 6 is an illustration of an extension to a rear substrate showing first, second and third mounting points.

In accordance with the invention, the rear substrate 14 of the LCD module 12 extends along its principal plane so as to provide a ledge 26 for fixing the LCD module 12 to an LCD module frame 27 in a carrier product 28. The carrier product 28 may comprise a mobile telephone, as shown in FIG. 5. The ledge 26 is provided such that the rear substrate extends along its principal plane beyond the perimeter of the front substrate, such that portions of its inner face 17, outer face 20 and end face 29 are exposed. Referring to FIG. 6, mounting points 30-32 are provided on the inner face 17, end face 29 and outer face 20 of the ledge 26 for fixing the LCD module 12 to the LCD module frame 27.

Referring to FIG. 3, in one embodiment of the invention, the rear substrate 14 is secured to the module frame 27 by fixings to its inner face 17 and its end face 29. These fixings may be provided by an adhesive material or a gasket, as described in reference to FIG. 1, or may be provided by other appropriate means, for example a snap-mechanism.

Figure 7:
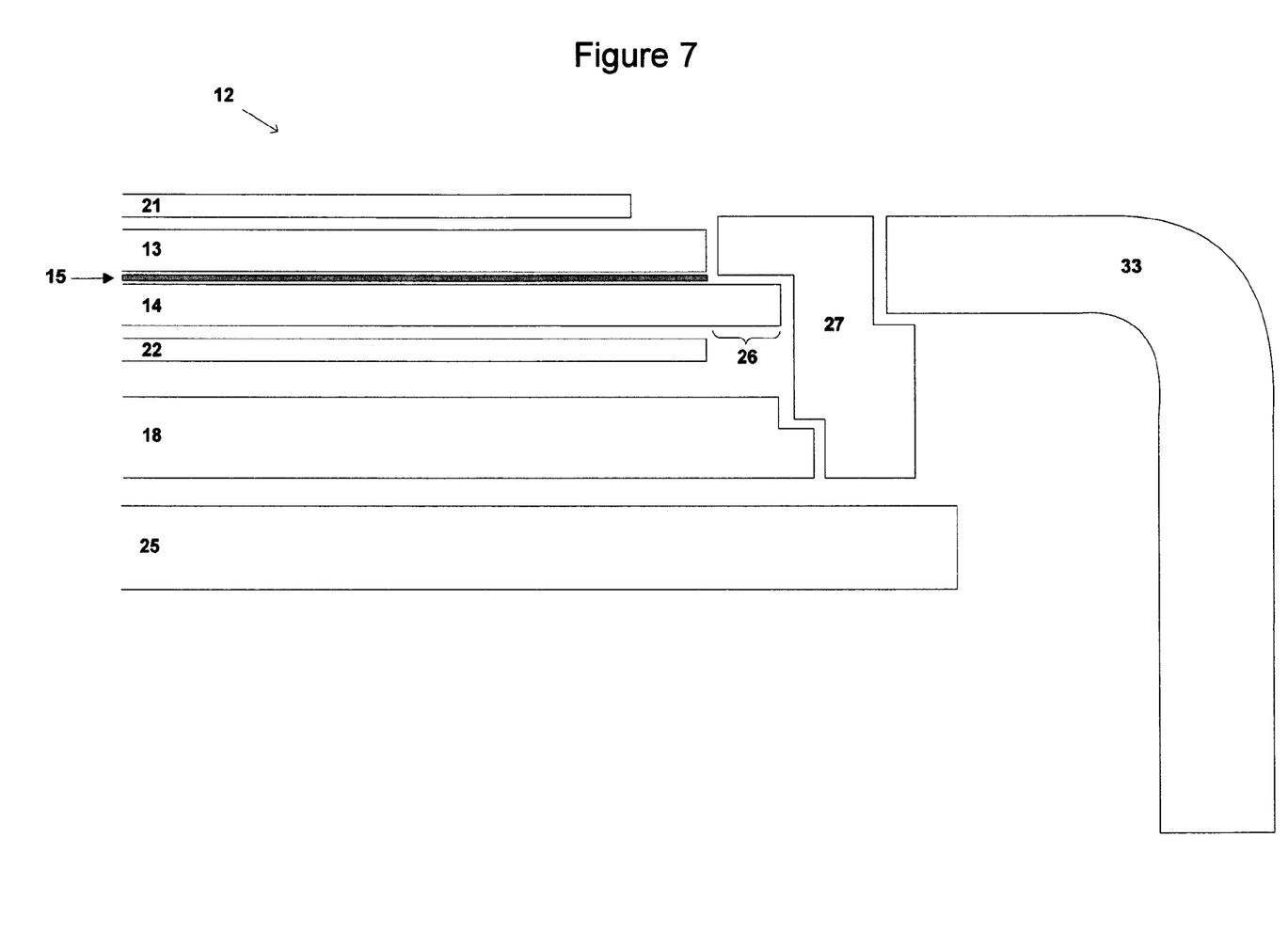
FIG. 7 is an illustration as in FIG. 3, including a cover of a carrier product.
Figure 8:
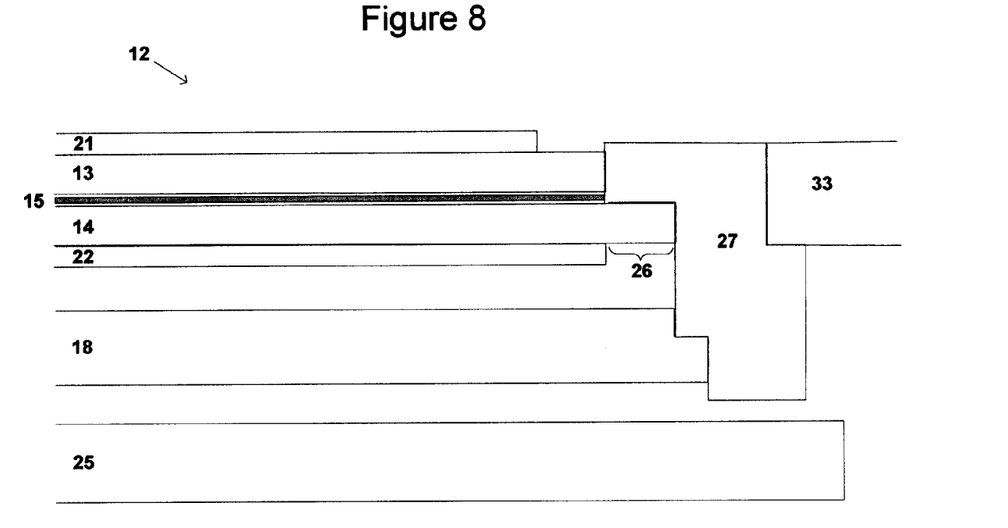
FIG. 8 is an illustration showing a method of fixing an LCD module to an LCD module frame corresponding to FIGS. 3 and 5.

Referring to FIG. 7, the LCD module 12, as shown in FIG. 3, is received by the carrier product 28, which has a cover 33. The construction of the LCD module 12 allows the outer surface of the cover 33 to lie flush with the outer face 19 of the front substrate 13. This is made possible by the extension 26 to the rear substrate 14, as previously discussed, which obviates the need for a fixing 11 between the outer surface of the front substrate 13 and the product cover 33. An example of how the above-described fixings may secure the LCD is position is shown in FIG. 8.

Accordingly, the benefits in depth provided by the use of an LCD may be maximised and propagated fully to the depth of the carrier product 28.

Figure 9:
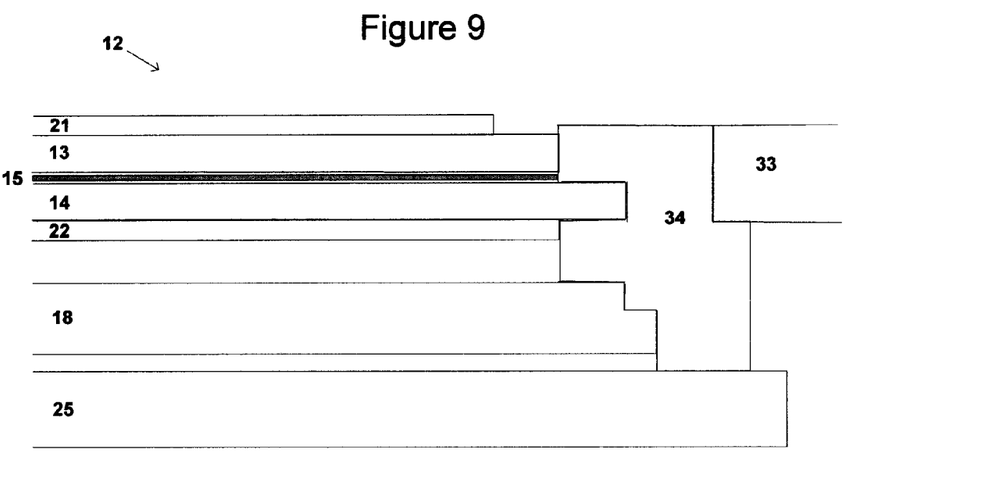
FIG. 9 is an illustration showing a further method, in accordance with the invention, of fixing an LCD module to an LCD module frame.

Referring to FIG. 9, in another embodiment of the invention, the LCD module 12 may be supported by fixings from an LCD module frame 34 to the inner face 17, outer face 20 and end face 29 of the extended portion 26 of the lower substrate 14. The fixings between the frame 34 and the substrate 14 may be provided according to the fixings described in reference to FIGS. 1-8.

Figure 10:
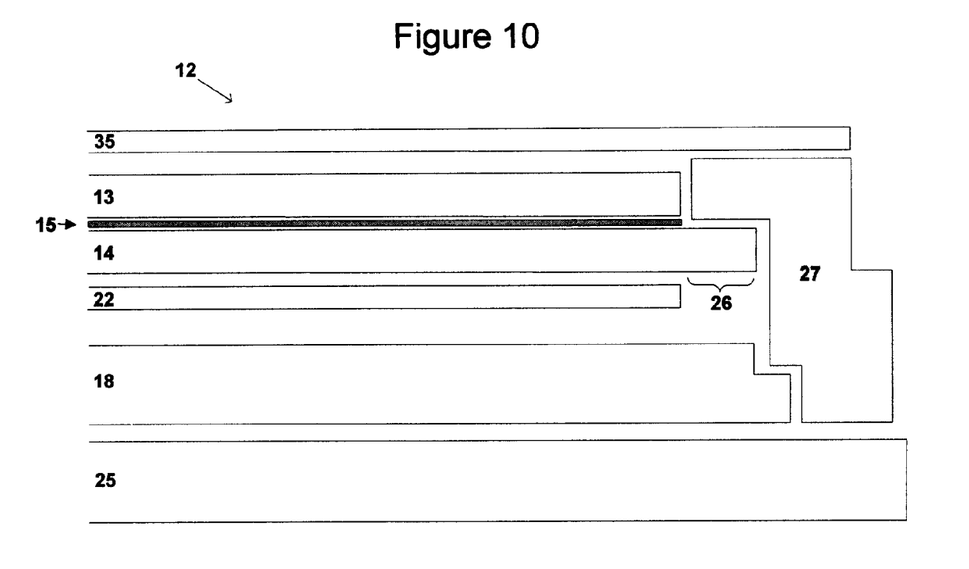
FIG. 10 is an illustration showing an exploded view of a method of fixing an LCD module to an LCD module frame, including an extended polarizing layer.

Referring to FIG. 10, the LCD module 12 may comprise an extended polarizing layer 35 on the outer face 19 of the front substrate 13. The extended polarizing layer 35 is applied such that, in addition to the face 19 of the front substrate 13, it covers part of or all of a front surface of the module frame 27,34. FIG. 10 shows the extended polarizing layer 35 in an embodiment corresponding to FIGS. 3,7 and 8; however, the extended polarizing layer 35 may additionally be employed with the embodiment shown in FIG. 9, or with any suitable alternatives. In one embodiment of the invention, the composition of the polarizing layers 21,22,35 may integrate Polymethylmethacrylate (PMMA) to provide improved light transmission.

Figure 11:
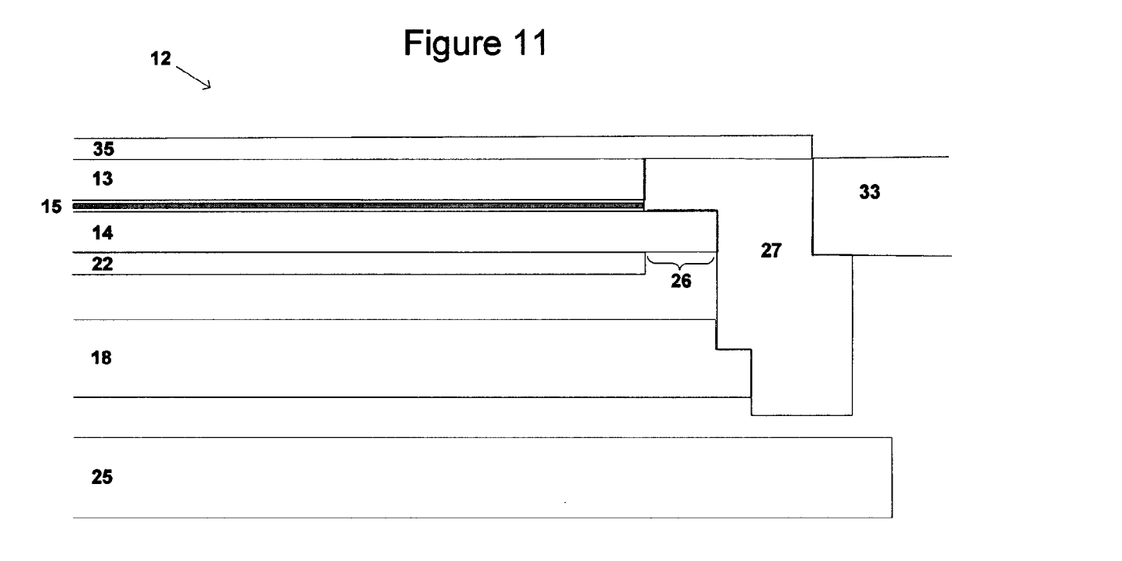
FIG. 11 is an illustration showing a method of fixing an LCD module to an LCD module frame corresponding to FIG. 8.

An example of how the fixings corresponding to FIG. 10 may fit into position is shown in FIG. 11.

Figure 12:
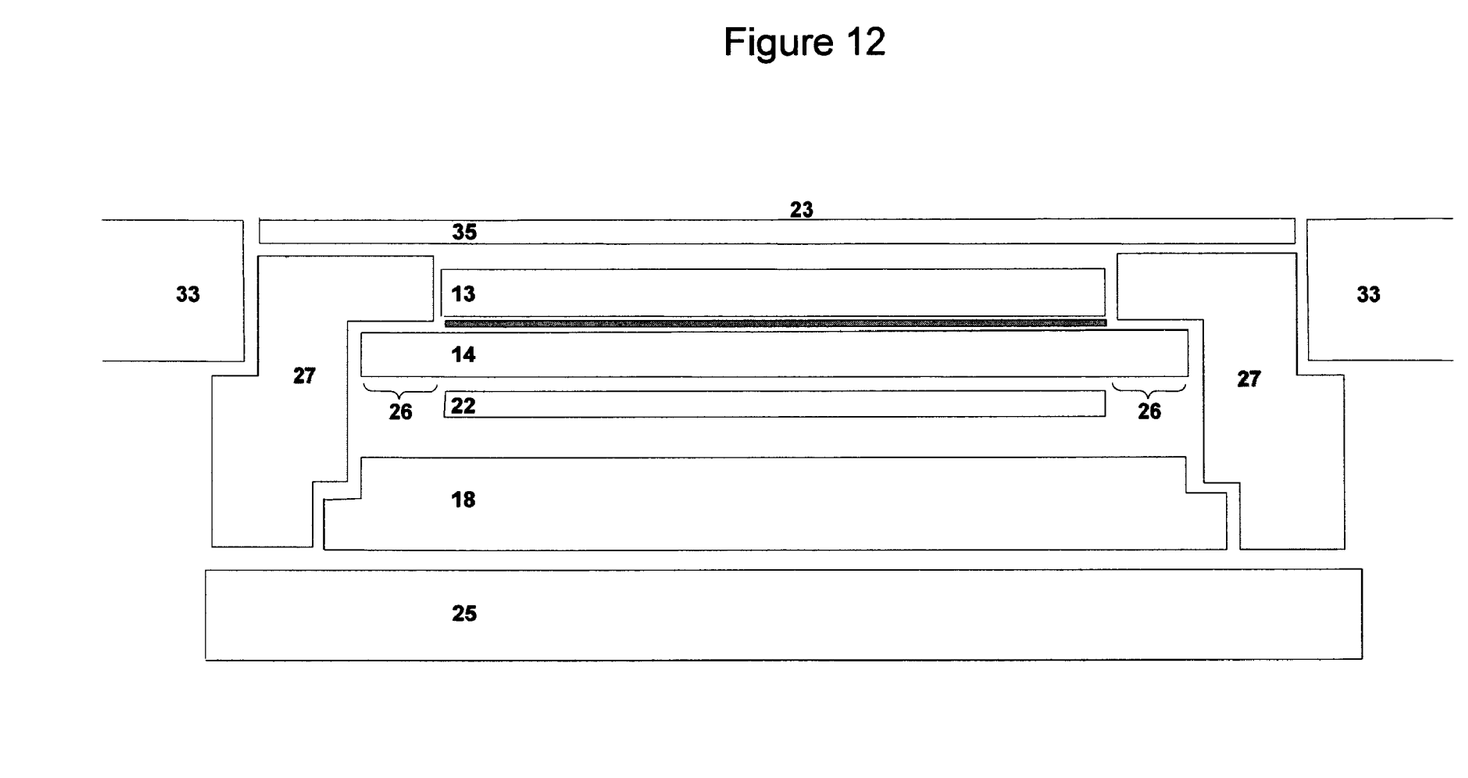
FIG. 12 is an illustration showing a cross-section of an LCD module, received in an LCD module frame of a carrier product.

Referring to FIG. 12, the LCD module 12 is received in a carrier product 28 by an LCD module frame 27. FIG. 12 shows the cover 33 of the carrier product 28 lying flush with the outer face 23 of the polarizer 35; however, in another embodiment of the invention, the cover 33 may lie flush with outer face 19 of the front substrate 13, as shown in FIG. 10. Similarly, the extended polarizing layer 35 may be replaced by the standard polarizing layer 21. Although the invention has been described in relation to LCD modules to be received by portable devices such as mobile telephones, laptop and handheld computers, the invention could equally be received in much larger devices, for example LCD television sets. In addition, the invention is equally applicable to other types of display apparatus having front and rear substrates, such as plasma displays.

The invention claimed is:

1. An apparatus comprising:
    a display module comprising a front substrate and a rear substrate, the front substrate comprising an outer face, wherein the rear substrate of the display module extends along its principal plane beyond the perimeter of the front substrate to provide a ledge comprising an inner face; and
    a module frame configured to receive the display module and hold the display module in place at least partially via at least one fixing between the module frame and the inner face of the ledge, wherein
    the apparatus is configured to be held in a carrier product, comprising an external surface, and wherein when the apparatus is held in the carrier product the external surface of the carrier product is substantially flush with the outer face of the front substrate.

2. An apparatus according to claim 1 wherein the display module further includes a mounting point on the inner face of the ledge and a fixing between that mounting point and a face of the module frame.

3. An apparatus according to claim 1 wherein the rear substrate has an end face and the display module further includes a mounting point on the end face of the ledge and a fixing between that mounting point and a face of the module frame.

4. An apparatus according to claim 1 wherein the rear substrate has an outer face and the display module further includes a mounting point on the outer face of the ledge and a fixing between that mounting point and a face of the module frame.

5. An apparatus according to claim 1 wherein the front substrate has an inner face, the rear substrate has an inner face and the display module further includes electrically conductive material, the conductive material being applied to the inner face of each substrate to provide a series of parallel, conductive ridges on the inner face of each substrate.

6. An apparatus according to claim 5 wherein the substrates are aligned such that the direction of the conductive ridges on the inner face of the front substrate is perpendicular to the direction of the conductive ridges on the inner face of the rear substrate.

7. An apparatus according to claim 5 further including a plurality of integrated circuits and a printed circuit board, wherein the integrated circuits are adapted to control a flow of charge through the conductive material and the integrated circuits are connected to the printed circuit board.

8. An apparatus according to claim 5 wherein the display module comprises a liquid crystal display module further including polarizing filters and liquid crystal material, the liquid crystal material being held in a sealed cavity between the substrates.

9. An apparatus according to claim 8 wherein the composition of the polarizing layers includes Polymethylmethacrylate.

10. An apparatus according to claim 8 including a lightguide, wherein the liquid crystal display module is configured to be illuminated from the rear by light scattered from the lightguide (18).

11. An apparatus according to claim 8 wherein the rear substrate has an outer face and the polarizing filters are applied to the outer faces of the front and rear substrates to filter incident electromagnetic radiation.

12. An apparatus according to claim 11 wherein the polarizing layer on the outer face of the front substrate extends along its principal plane to cover a surface of the module frame.

13. An apparatus according to claim 11 wherein the substrates are aligned such that the polarizing plane of the polarizing filter applied to the face of the front substrate is perpendicular to the polarizing plane of the polarizing filter applied to the face of the rear substrate.

14. An apparatus according to claim 8 wherein a polarization filter is applied to the outer face of each substrate such that the polarization plane of the polarization filter corresponds with the direction of the conductive ridges on the inner face of the substrate.

15. An apparatus according to claim 8 wherein the liquid crystal material includes nematic liquid crystals.

16. An apparatus according to claim 8 further including an array of thin film transistors, wherein the liquid crystal display module is an active matrix liquid crystal display module.

17. An apparatus according to claim 8 wherein the liquid crystal display module is a passive matrix liquid crystal display module.

18. An apparatus according to claim 1 wherein the substrates comprise panels of plastics material.

19. A carrier product including an apparatus according to claim 1.

20. A mobile telephone including an apparatus according to claim 1.

21. An apparatus according to claim 1, wherein the fixing is made directly between the module frame and the inner face of the ledge.

22. An apparatus according to claim 1, wherein when the apparatus is held in the carrier product the external surface of the carrier product is substantially flush with the outer face of the front substrate at a point of the external surface of the carrier product closest to the outer face of the front substrate.

23. A method comprisinqe:
    fixing a display module to a module frame the display module comprising a front substrate and a rear substrate, the front substrate comprising an outer face, wherein the rear substrate extends along its principal plane to provide a ledge, the method further comprising:
    fixing an inner face of the ledge to a face of the module frame, wherein the apparatus is configured to be held in a carrier product, comprising an external surface, and wherein when the apparatus is held in the carrier product the external surface of the carrier product is substantially flush with the outer face of the front substrate.

24. A method according to claim 23 further comprising: fixing an end face of the ledge to a face of the module frame.

25. A method according to claim 23 further comprising: fixing an outer face of the ledge to a face of the module frame.

26. A method according to claim 23 further comprising: fixing the module frame to a the carrier product.

27. A method according to claim 23 wherein the inner face of the ledge is fixed to the module frame with a layer of adhesive.

28. A method according to claim 23 wherein the inner face of the ledge is fixed to the module frame with a layer of double-sided tape.

29. A method according to claim 23 wherein the inner face of the ledge is fixed to the module frame using a gasket.

30. A method according to claim 23 wherein the display module is a liquid crystal display module.

* * * * *

UNITED STATES PATENT AND TRADEMARK OFFICE
CERTIFICATE OF CORRECTION

PATENT NO. : 8,189,133 B2
APPLICATION NO. : 12/278425
DATED : May 29, 2012
INVENTOR(S) : Antero Aaltonen It is certified that error appears in the above-identified patent and that said Letters Patent is hereby corrected as shown below:

Column 6, Claim 23, Line 52:
  Please delete "comprisinqe" and replace with --comprising--

Column 7, Claim 26, Line 2:
  Please delete "to a the" and replace with --to the--

Signed and Sealed this
Ninth Day of October, 2012

David J. Kappos
*Director of the United States Patent and Trademark Office*